(12) United States Patent
Iyer (10) Patent No.: US 8,707,428 B2
(45) Date of Patent: Apr. 22, 2014

(54) APPARATUS AND METHOD FOR DEFENDING AGAINST INTERNET-BASED ATTACKS

(75) Inventor: Savitha Iyer, Mountain House, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 399 days.

(21) Appl. No.: 12/851,279

(22) Filed: Aug. 5, 2010

(65) Prior Publication Data

US 2012/0036576 A1    Feb. 9, 2012

(51) Int. Cl.
*G06F 11/00* (2006.01)

(52) U.S. Cl.
USPC .......................................................... 726/22

(58) Field of Classification Search
USPC ................................................ 726/12, 22–30
See application file for complete search history.

(56) References Cited

U.S. PATENT DOCUMENTS

| | | | |
|---|---|---|---|
| 7,058,974 B1 | 6/2006 | Maher, III et al. | |
| 7,657,934 B2 | 2/2010 | Poletto et al. | |
| 7,672,336 B2 | 3/2010 | Bharrat et al. | |
| 7,730,537 B2 | 6/2010 | Bardsley et al. | |
| 8,150,373 B1* | 4/2012 | Upadhyay et al. | 455/411 |
| 2005/0144441 A1 | 6/2005 | Govindarajan | |
| 2010/0082513 A1 | 4/2010 | Liu | |
| 2010/0169975 A1 | 7/2010 | Stefanidakis et al. | |
| 2010/0325427 A1* | 12/2010 | Ekberg et al. | 713/156 |
| 2011/0283359 A1* | 11/2011 | Prince et al. | 726/23 |
| 2012/0023090 A1* | 1/2012 | Holloway et al. | 707/709 |
| 2013/0103752 A1* | 4/2013 | Kimoto | 709/203 |

* cited by examiner

*Primary Examiner* — Brandon Hoffman
*Assistant Examiner* — Carlos Amorin
(74) *Attorney, Agent, or Firm* — Akerman LLP; Michael K. Dixon; Roy P. Zachariah (57) ABSTRACT

A system for defending against internet-based attacks is disclosed. The system may include a processor which may be configured to receive information associated with a device when a web request is transmitted by the device to access a web page monitored by the processor. The processor may also determine whether traffic associated with the web request from the device is suspected of being used for malicious activity and, if not, enable the device to access the web page. If the traffic is suspected of being used for malicious activity, then the processor may transmit a challenge to the device if the traffic is determined to be suspected. Furthermore, the processor may receive information associated with the web request, which may be provided by a uniform resource locator invoked in response to the traffic being determined to be suspected.

20 Claims, 11 Drawing Sheets

WE ARE SORRY. OUR SYSTEMS ARE CURRENTLY UNDER HEAVY LOAD.

TO BE ABLE TO USE OUR SITE, PLEASE CALL US AT 1-800-248-3632.

THANK YOU FOR YOUR PATIENCE.

WE'RE SORRY BUT TO PREVENT AUTOMATED SPYWARE/VIRUSES FROM ACCESSING OUR SITE, YOU NEED TO RESPOND TO THE CHALLENGE BELOW. YOU WILL BE REQUIRED TO DO THIS JUST ONCE FOR THIS SESSION. IF YOU HAVE A PROBLEM, PLEASE CONTACT US AT ATT.COM!
TO CONTINUE ACCESSING OUR SITE, PLEASE ENTER THE TEXT YOU SEE IN THE IMAGE BELOW.

1rd5xw

TYPE THE CHARACTERS YOU SEE ABOVE IN THIS BOX [ ]

SUBMIT

| ID | IPADDRESS | USERAGENT | FIRSTRECEIVEDTIME | LASTRECEIVEDTIME | CUSTOMERIDFK | SESSIONID | CHALLENGE STATUS | COUNTER | PUZZLE TEXT | DESTINATIONURL |
|---|---|---|---|---|---|---|---|---|---|---|
| 20 | 135.70.230.178 | MOZILLA/5.0 | 2009-12-01 17:08:49 | 2009-12-01 17:08:56 | 1 | 2FACDD5F0B34B683C1E406CA4E108B0A | NODATA | 2 | 1RD5XW | HTTPS://CMS87.CSO.ATT.COM/CUSTAPP-ATT |

File Edit View Favorites Tools Help

@ATT.COM HTTPS://CMS87.CSO.ATT.COM/CUSTAPP-ATT/ at&t   HELLO! THIS IS THE NORMAL PAGE.

| ID | IPADDRESS | USERAGENT | FIRSTRECEIVEDTIME | LASTRECEIVEDTIME | CUSTOMERIDFK | SESSIONID | CHALLENGE STATUS | COUNTER | PUZZLE TEXT | DESTINATIONURL |
|---|---|---|---|---|---|---|---|---|---|---|
| 20 | 135.70.230.178 | MOZILLA5.0 | 2009-12-01 17:08:49 | 2009-12-01 17:08:56 | 1 | 2FACDD5F0B34B683C1E406CA4E108B0A | PASS | 3 | 1RD5XW | HTTPS://CMS87.CSO.ATT.COM/CUSTAPP-ATT |

IDENTIFICATION OF IPS TO BE BLACKLISTED

| ↓T | | ID | IPADDRESS | USERAGENT | FIRSTRECEIVEDTIME | LASTRECEIVEDTIME | CUSTOMERIDFK | SESSIONID | CHALLENGE STATUS | COUNTER | PUZZLE TEXT | DESTINATIONURL |
|---|---|---|---|---|---|---|---|---|---|---|---|---|
| ☐ ✎ ✗ | | 20 | 135.70.230.178 | MOZILLA5.0 | 2009-12-01 17:08:49 | 2009-12-01 17:08:56 | 1 | 2FACDD5F0B34B683C1F406CA4E108B0A | PASS | 3 | IRD5XW | HTTPS://CM87.CSO.ATT.COM /CUSTAPP-ATT |
| ☐ ✎ ✗ | | 21 | 135.68.58.66 | CURL/7.12.1 | 2009-12-02 07:39:13 | 2009-12-02 07:39:13 | 1 | 9088CDD5F0B34B6836601 4997DBECD501 | NODATA | 1 | | |

1002 → (row 20)
1004 → (row 21)
1000

APPARATUS AND METHOD FOR DEFENDING AGAINST INTERNET-BASED ATTACKS

FIELD OF THE INVENTION

The present application relates to internet security and, more particularly, to an apparatus and method for defending against internet-based attacks.

BACKGROUND

Recent technological advances have significantly improved business efficiencies, data and information exchange, and overall standard of living for millions of people. Despite such advances, technology continues to be susceptible to various types of attacks utilized by hackers such as, but not limited to, denial of service attacks, computer worms, computer viruses, malware, spyware, spam, among other types of attack methods. In order to protect themselves from such attacks, consumers and businesses often utilize firewalls, antivirus software, and other security features to prevent attacks and/or minimize the impact from such attacks. Many current security programs attempt to explicitly identify malicious traffic such as by deducing that the traffic is malicious from observable traffic patterns. However, the processes utilized in identifying and combating malicious traffic can often mistakenly identify legitimate traffic as malicious and/or fail to effectively mitigate malicious traffic. Even if consumers or businesses provide service providers with black and white lists that identify illegitimate and legitimate traffic, such lists are difficult to verify, particularly during an attack.

SUMMARY

A system for defending against internet-based attacks may be provided. The system may be configured to require data traffic to identify itself as legitimate traffic. Visitors may identify their traffic as legitimate or non-malicious by accurately responding to one or more challenges provided by a service provider. Additionally, traffic and/or devices associated with the traffic may be configured to identify the traffic as legitimate by responding to one or more challenges. If correct responses are received by the service provider in response to the one or more challenges, access to one or more web pages may be granted to the traffic and/or devices. In accordance with an aspect of the exemplary embodiment, the system may include an electronic data processor which may be configured to receive a script request when a web request is transmitted by a device to a customer server to access a web page. The script request may be generated based on a code segment of the web page. The electronic data processor may also be configured to receive information associated with the device when the web request is transmitted by the device to access the web page monitored by the electronic data processor. The electronic data processor may be configured to determine if traffic associated with the web request from the device is suspected of being used for malicious activity, and the processor may enable the device to access the web page if the traffic is determined not to be suspected of being used for malicious activity. Additionally, the processor may be configured to transmit a challenge to the device if the traffic is determined to be suspected of being used for malicious activity. Furthermore, the processor may be configured to receive information associated with the web request, wherein the information associated with the web request is provided by a uniform resource locator invoked in response to the traffic being determined to be suspected of being used for malicious activity. Moreover, the processor may be configured to authorize the device to access the web page based on at least one of a correct response to the challenge being received from the device, positive results from analysis of the information associated with the device, and positive results from analysis of the information associated with the web request.

In accordance with an aspect of the exemplary embodiments, a method for defending against internet-based attacks may be provided. The method may include receiving a script request when a web request is transmitted by a device to a customer server to access a web page. Notably, the script request may be generated based on a code segment of the web page. The method may also include receiving information associated with the device, which may be based on the script request generated from the code segment. Additionally, the method may include determining whether traffic associated with the web request from the device to the customer server is suspected of being used for malicious activity. The method may further include enabling the device to access the web page if the traffic is determined not to be suspected of being used for malicious activity. Furthermore, the method may include transmitting a challenge to the device if the traffic is determined to be suspected of being used for malicious activity and receiving information associated with the web request. The information associated with the web request may be provided by a uniform resource locator invoked in response to the traffic being determined to be suspected of being used for malicious activity. Finally, the method may include authorizing the device to access the web page based on at least one of a correct response to the challenge being received from the device, positive results from analysis of the information associated with the device, and positive results from analysis of the information associated with the web request.

According to another exemplary embodiment, a computer-readable medium comprising instructions for defending against internet-based attacks may be provided. The computer instructions when loaded and executed by an electronic processor, may cause the electronic processor to perform activities including the following: receiving a script request when a web request is transmitted by a device to a customer server to access a web page, wherein the script request is generated based on a code segment of the web page; receiving information associated with the device when the web request is transmitted by the device to access the web page; determining if traffic associated with the web request from the device is suspected of being used for malicious activity; enabling the device to access the web page if the traffic is determined not to be suspected of being used for malicious activity; transmitting a challenge to the device if the traffic is determined to be suspected of being used for malicious activity; receiving information associated with the web request, wherein the information associated with the web request may be provided by a uniform resource locator invoked in response to the traffic being determined to be suspected of being used for malicious activity; and authorizing the device to access the web page based on at least one of a correct response to the challenge being received from the device, positive results from analysis of the information associated with the device, and positive results from analysis of the information associated with the web request.

The above-described and other features of the present disclosure will be appreciated and understood by those skilled in the art from the following detailed description, drawings, and appended claims.

DETAILED DESCRIPTION OF THE INVENTION

The exemplary embodiments of the present disclosure are described with respect to systems and methods for defending against internet-based attacks. Systems and methods, as described in the present disclosure, can be utilized to effectively defend against internet-based attacks and malicious activity. Malicious activity may include, but is not limited to include, denial of service attacks, computer worms, computer viruses, malware, spyware, spam, among other types of attack methods. The systems and methods disclosed herein may require internet or other traffic, such as HTTP/HTTPS traffic, to identify itself as legitimate or non-malicious traffic rather than actively attempting to identify malicious traffic. This may allow for a reduction in the amount of legitimate traffic that may be black holed as malicious since the legitimate traffic is identifying itself. Additionally, by having the traffic identifying itself as legitimate, it enables such systems to work well with various types of internet traffic such as, but not limited to, secure socket layer (SSL) traffic. The exemplary embodiments of the present disclosure can be applied to other types of systems and methods.

Figure 1:
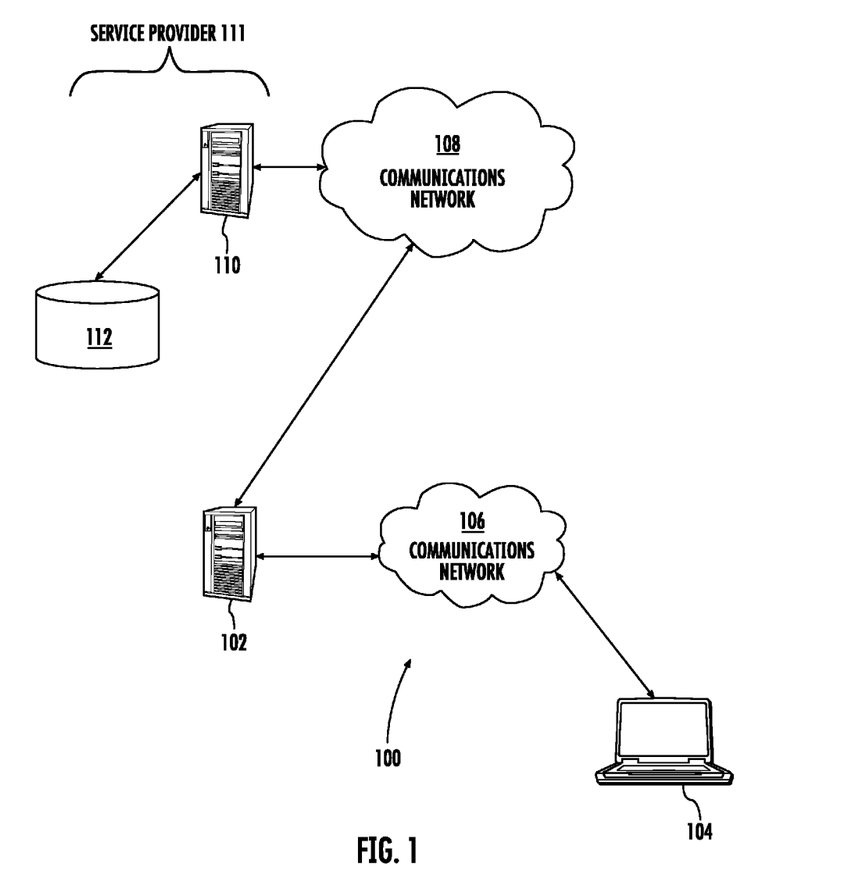
FIG. 1 is a schematic view of a system for defending against internet-based attacks according to an embodiment of the present invention.

Referring to the drawings and in particular FIG. 1, an exemplary system 100 for defending against internet-based attacks is schematically illustrated. The system 100 may include a customer server 102, which may belong to a customer of a service provider 111. The customer server 102 may be formed from and/or combined with other types of computing devices such as, but not limited to, a computer, an electronic processor, a hand-held device, a personal digital assistant, a mobile device, a communications device, a router, among other devices. Such devices can be used in conjunction with one another as well. Customer server 102 may be configured to serve web pages and other content associated with an internet/web site to various visitors seeking to access the web pages and other content. Other content may include, but is not limited to including, audio content, video content, and/or other types of media content.

The system 100 may also include a computing device 104. Computing device 104 may be associated with one or more visitors who may seek to access the web pages and content provided by customer server 102. In an embodiment, computing device 104 may be, but is not limited to being, a personal computer, a telephone, a television set, a smart phone, a mobile device, a personal digital assistant, and a variety of other computing devices. Computing device 104 may be configured to access customer server 102 via a communications network 106. Communications network 106 may be a local area network, wide area network, the Internet, a wireless network, a broadband network, a satellite network, cellular network, a virtual private network, and/or a variety of other types of networks. The system 100 may further include another communications network 108, which the customer's server 102 may utilize to access devices associated with the service provider 111. In an embodiment, communications network 108 may be any of the types of networks described above for communications network 106.

Additionally, the system 100 may include equipment and devices associated with the service provider 111 of the customer. The service provider 111 may have a server 110, which may be configured to transmit web pages, process requests, monitor web traffic associated the customer, transmit challenges to visitors, and perform a variety of other processing functions. Furthermore, the service provider 111 may include a database 112, which may be configured to store various types of data and content. In other embodiments, numbers of servers 102, servers 110, databases 112, communications networks 106 and 108, and computing devices 104 can be varied. The particular configuration of the system 100 can vary depending on customer and/or service provider preferences.

Figure 2:
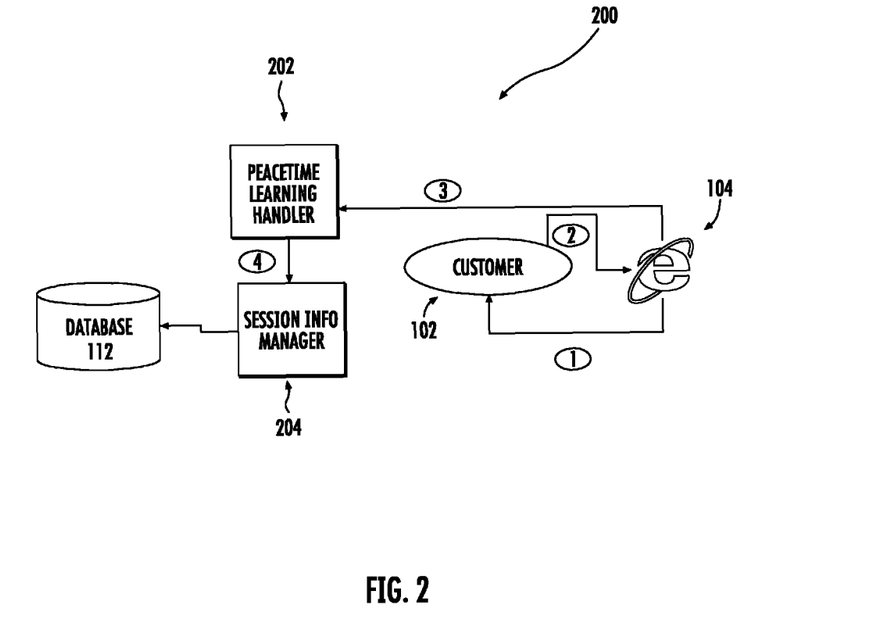
FIG. 2 is a schematic view of the system of FIG. 1 during peacetime.

The system 100 may be configured to have different modes of operation. In one embodiment, as shown in FIG. 2, the system 100 may be configured to operate in a peacetime mode. Peacetime mode can be a mode in which the system 100 collects data about visitors when system 100 is not determined to be currently under attack and/or there is no traffic of the visitors that is suspected of being utilizing for malicious activity. During peacetime mode, a visitor utilizing computing device 104 may attempt to access a web page or other internet-based resource provided by a customer of a service provider 111, which is shown as interaction 1 in FIG. 2. Customer server 102, in interaction 2, may respond to the visitor by transmitting the web page to the visitor's computing device 104, which may be displayed or otherwise rendered to the visitor. Each of the customer's web pages may include a code segment (e.g. JavaScript code segment) provided by the service provider 111. When a browser of the visitor attempts to access the web page, a script request (e.g. JavaScript call) may be triggered and sent to the service provider's servers 110 in interaction 3.

Figure 8:
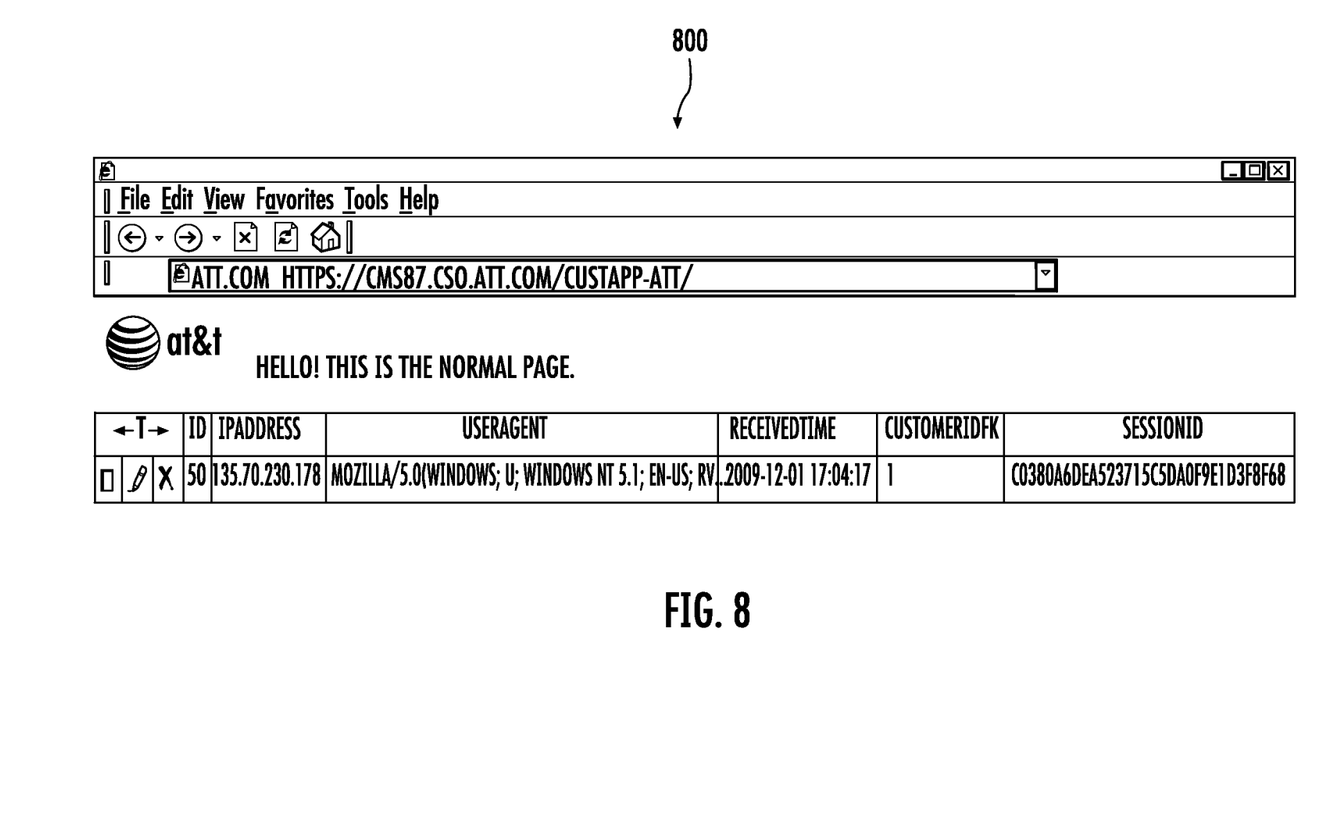
FIG. 8 is a screenshot featuring a sample set of metrics that are collected by a service provider during peace time.

Based on the script request, the service provider 111 may access and/or log information associated with the computing device 104 via the one or more servers 110 in interaction 4. For example, in the architecture 200 of the system 100 as shown in FIG. 2, one of the servers 110 may be a peacetime learning handler 202 which may be configured to receive the script request. Another one of the servers 110 may be a session information manager 204, which may be configured to access and process the information associated with the computing device 104. Such information may include, but is not limited to including, an internet protocol address of the visitor, the uniform resource locator associated with the web page the visitor was attempting to access, a user agent string from an HTTP header field, a time stamp, a customer identifier, a visitor identifier, and/or other information. FIG. 8 shows an interface 800 that displays such information. The received information may be stored in a database of the service provider 111 such as database 112. This enables the service provider 111 to have a detailed history, which may be utilized to analyze visitors and traffic patterns of the visitors to determine if the visitors should be blocked from accessing the web pages of the customer.

Figure 3:
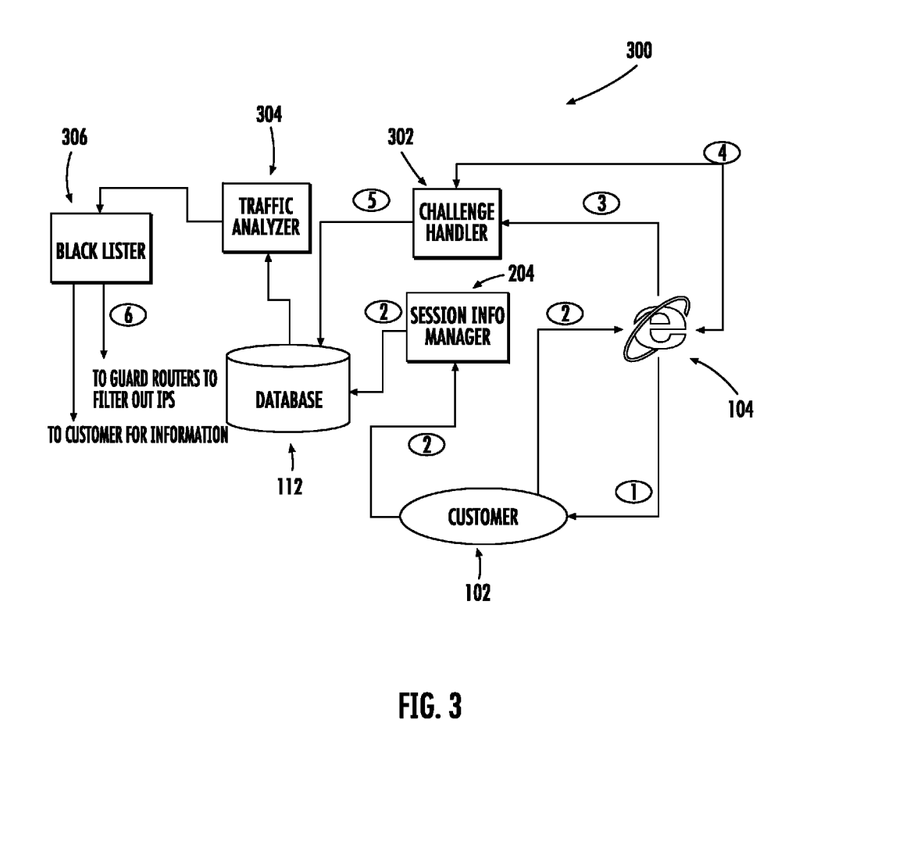
FIG. 3 is a schematic view of the system of FIG. 1 during an attack.

In addition to peacetime mode, the system 100 may include an attack mode as shown by the architecture 300 shown in FIG. 3. During attack mode, traffic from visitors that is suspected of being used for malicious activity may be affecting or potentially affecting the system 100. As shown in FIG. 3 and by interaction 1, attack mode may include customer server 102 receiving a web request from computing device 104 of a visitor to access a web page from customer server 102. The customer server 102 may respond to the request and also send information associated with the web request to the service provider's session information manager 204, which can record the data and information provided by the customer server 102 in interaction 2. The computing device 104 of the visitor may load the web page and make a script request (e.g. JavaScript call) to the service provider 111 by sending the script request to challenge handler 302 in interaction 3. The service provider 111 may log information associated with the computing device 104 based on the script request and may send a challenge to the computing device 104 during an attack if the computing device 104 is suspected of transmitting malicious traffic in interaction 4.

Additionally in interaction 4, the computing device 104 may respond back to the challenge issued from the challenge handler 302 with a response. If a response is not received or an incorrect response is received, the challenge handler 302 may issue additional challenges up to a threshold amount. For interaction 5 of FIG. 3, the service provider 111 may send all information received associated with the web request and computing device 104 to the traffic analyzer 304. The traffic analyzer 304 may look for traffic patterns and determine which web sessions associated with the computing device 104 have not had successful challenge responses. If the traffic analyzer 304 determines there to be malicious traffic patterns and/or unsuccessful challenge responses from the computing device 104, black lister 306 can add identifiers, such as internet protocol addresses, of the computing device 104 to a black list in interaction 6. Additionally, the identifiers may be sent to guard and router access control lists and optionally sent to the customer server 102.

Figure 4:
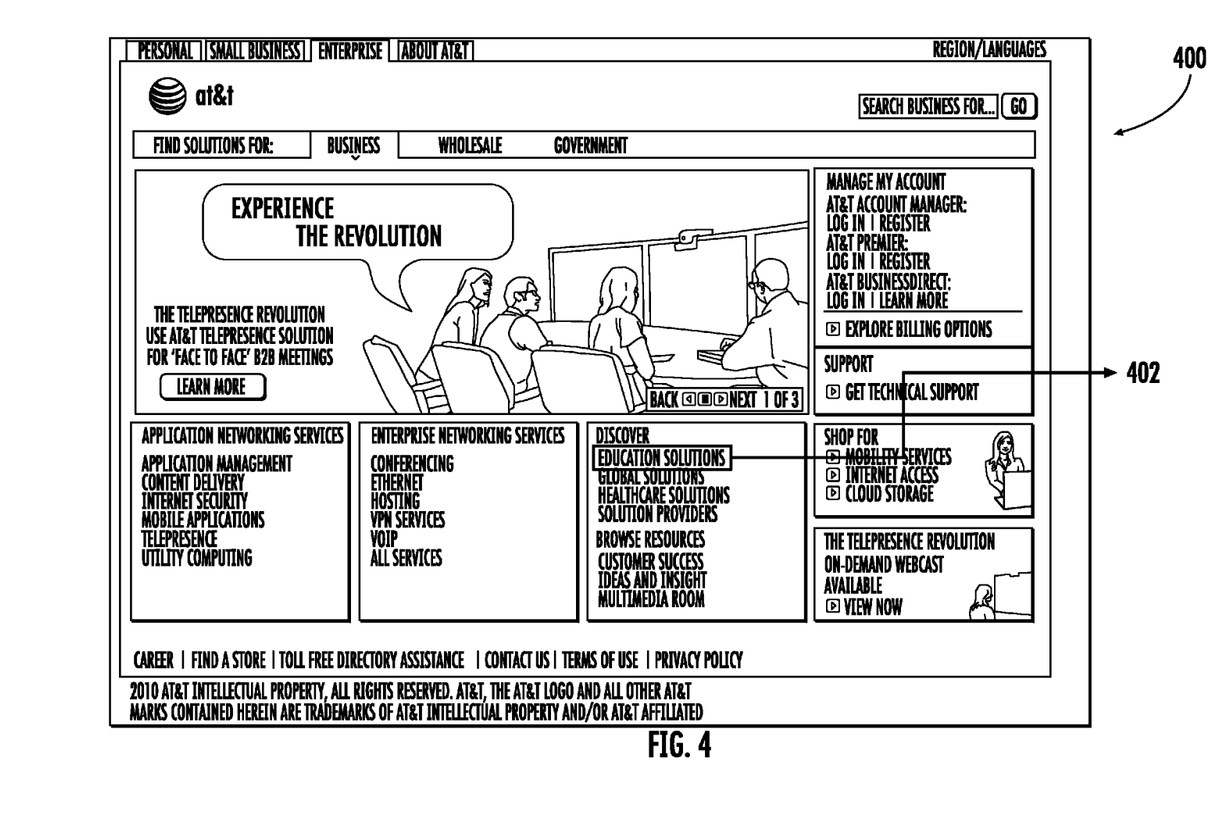
FIG. 4 is a screenshot including a code segment for defending against an attack.

With regard to further detail regarding attack mode operation, a visitor may utilize computing device 104 to attempt to access a web page of the service provider's customer. For example and referring additionally to FIG. 4, a web page 400 including a code segment for defending against an attack is illustratively shown. The visitor can click on a link 402 of the visitor's website so as to access the web page associated with the link 402. Upon clicking on the link 402, the service provider's server 110 may log information about the visitor and the computing device 104, which was generated by the code segment in the web page provided by the service provider 111. A server 110, such as the challenge handler 302 illustratively shown, may transmit a challenge to the computing device 104 of the visitor instead of allowing the visitor to view the intended web page associated with the link 402.

Figure 5:
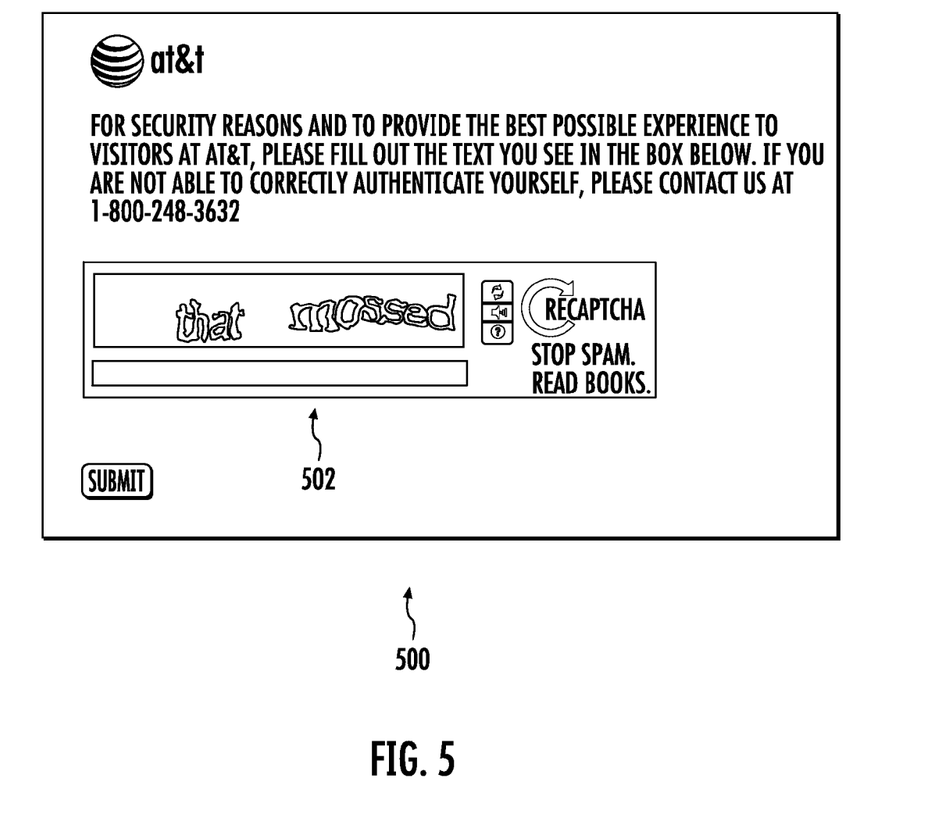
FIG. 5 is a screenshot featuring a security challenge provided to a visitor of the web page of FIG. 4.

The challenge may be utilized by the service provider 111 to prevent suspected bots or malicious activity from affecting the website of the customer. The challenge may be transmitted to the computing device 104 of the visitor via a different web page, a pop up, or through other means. Referring additionally to FIG. 5, a security challenge web page 500 provided to a visitor of the web page 400 of FIG. 4 is depicted. The security challenge web page 500 may include a challenge 502, which may be utilized to determine if the visitor is an actual person or a bot. Various types of challenges may be provided such as, but not limited to, puzzles, captchas (such as shown in FIG. 5), questionnaires, password requests, and quizzes. Additionally, visual, auditory, and/or a combination of visual and auditory challenges may be provided.

Figure 6:
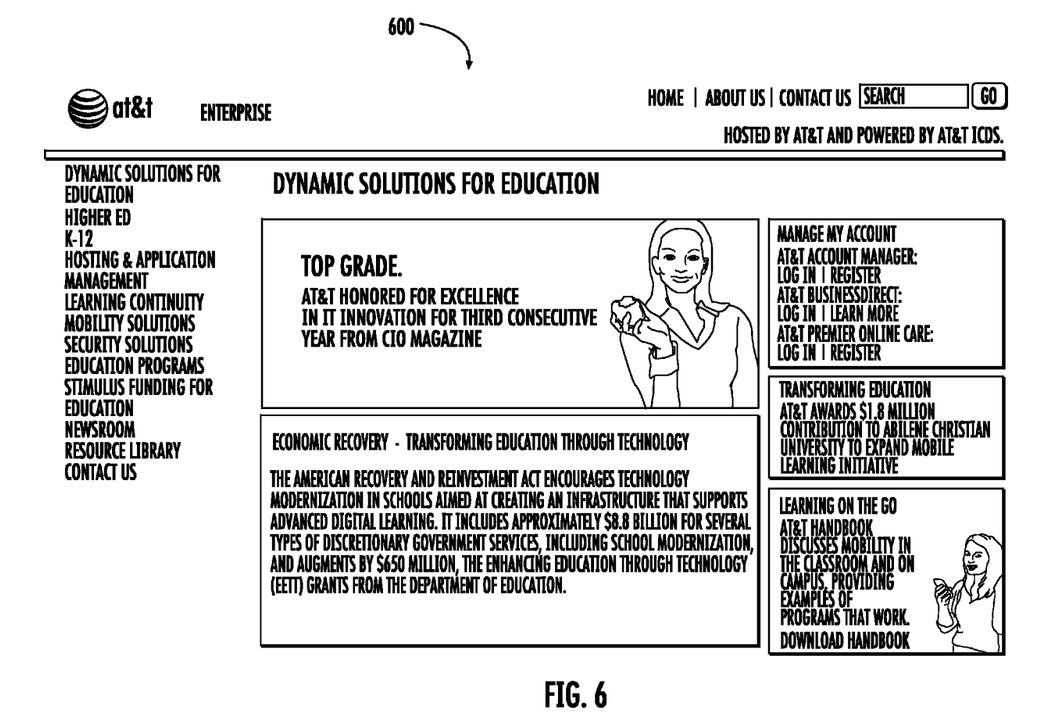
FIG. 6 is a screenshot featuring a web page that is displayed when a visitor effectively responds to the challenge provided in FIG. 5.

Once the challenge is received by the visitor, the visitor may then utilize computing device 104 to respond to the challenge. For example, using the captcha, "that mossed," as shown in FIG. 5, the visitor would need to enter in "that mossed" into the typing field of the challenge and submit the response to gain access to the web page associated with the link 402. If the visitor responds correctly to the challenge, in this case correctly types in "that mossed," the servers 110 of the service provider 111 may enable the visitor to access the web page associated with the link 402. Referring additionally to FIG. 6, the web page 600 associated with the link 402 that is displayed when a visitor effectively responds to the challenge provided in FIG. 5 is illustratively shown.

Figure 7:
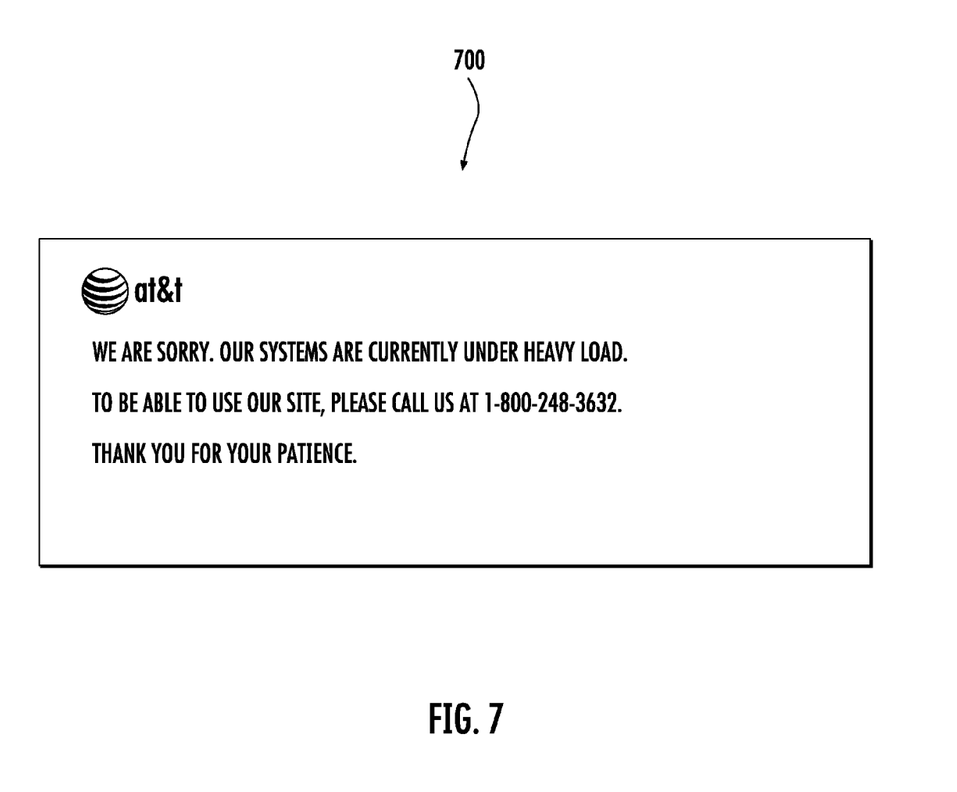
FIG. 7 is a screenshot featuring a web page that is displayed to a visitor when the visitor fails the challenge provided in FIG. 5.

However, if the visitor does not respond to the challenge or the visitor sends an incorrect response, the visitor may be denied access to the web page by the servers 110 of the service provider 111. In an embodiment, the servers 110 may re-issue challenges to the visitor up to a threshold amount. For example, if the visitor fails the first challenge, a second challenge can be sent. However, if the visitor fails the second time, the visitor may be denied another challenge and denied access to the intended web page. Additionally, if the servers 110 of the service provider 111 determine that the information associated with the device indicates malicious activity or is otherwise deemed to have a negative analysis rather than a positive analysis, the visitor can also be denied access. In an embodiment, if the visitor is denied access to the intended web page, an alternate web page 700 may be transmitted to the visitor, as shown in FIG. 7.

Figure 9:
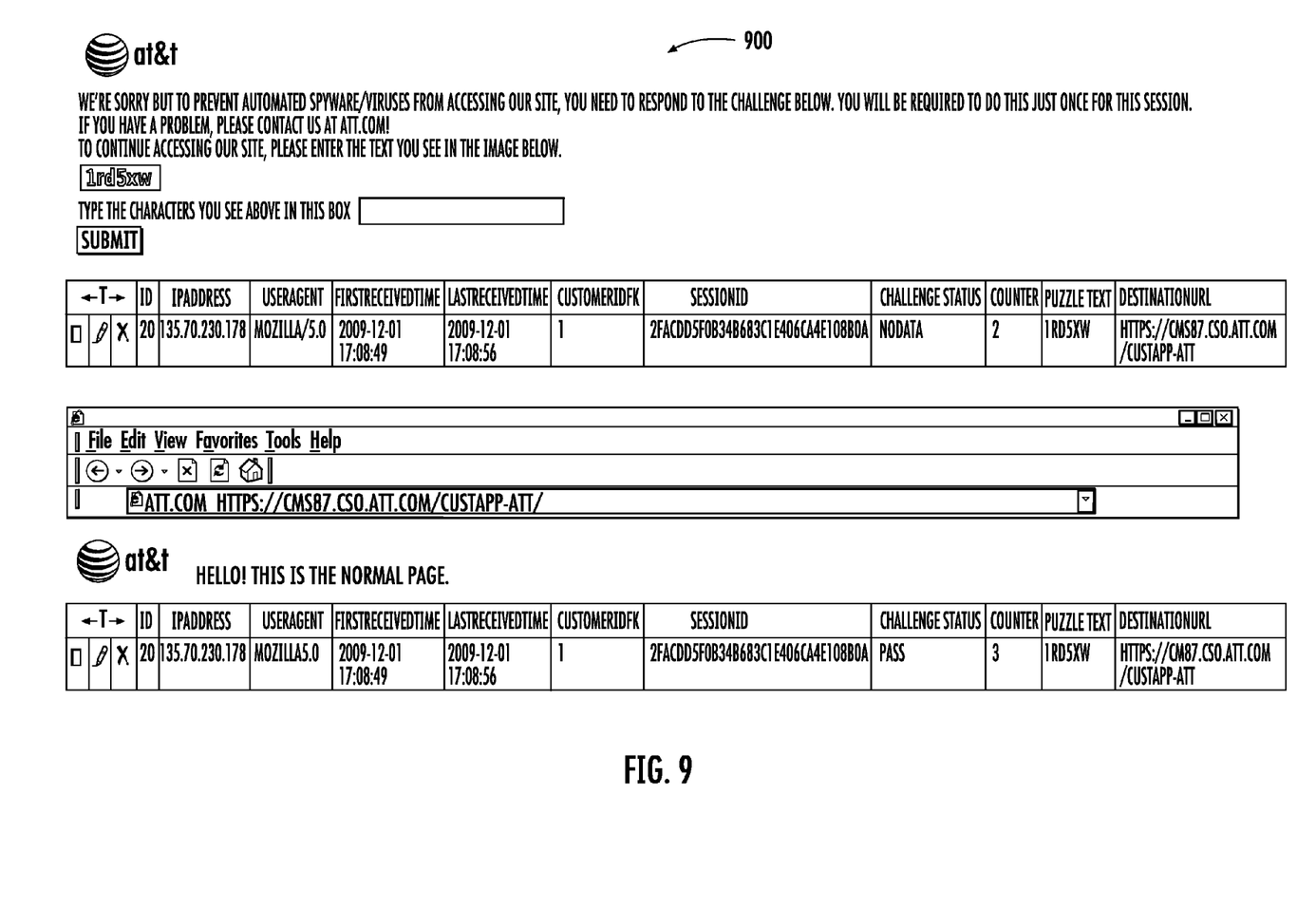
FIG. 9 is a screenshot featuring a sample set of metrics that are collected by a service provider during an attack.

In addition to logging the information generated from the script request, the customer's server 102 may also send additional information during attack mode to the servers 110 of the service provider 111. This additional information can include information about each web request initiated by the visitor, a session identifier associated with each session attempted by the visitor, an internet protocol address of the computing device 104, a user agent string associated with a header (e.g. HTTP header), and a uniform resource locator associated with the intended web page. The additional information depicted in the interface 900 as shown in FIG. 9 may be sent to the service provider 111 by invoking an application program interface and/or a uniform resource locator provided by the service provider 111. Furthermore, the service provider 111 may utilize even more information, which may be gathered and/or generated by the service provider 111. As shown in interface 900, such information may include, but not limited to including, a challenge status that indicates failures or passes of challenges, a customer identifier, a counter associated with the challenges, first and last received times, and the actual challenge. This additional information from the customer and the service provider 111 along with the initial information provided by the script request may be analyzed by one of the servers 110 of the service provider 111 to determine if a visitor needs to be blocked from the intended web page. For example, the session information manager 204 can record the information and the traffic analyzer 304 of FIG. 3 can analyze this information. If the analysis returns a positive result, then the computing device 104 may be granted access to the web page. However, if the analysis returns a negative result, then the computing device 104 may be denied access.

The servers 110 (traffic analyzer) may determine traffic patterns associated with the visitor based on the initial information and the additional information provided by the customer. If the servers 110 determine that the visitor's traffic is indicative of malicious activity, the servers 110 can prevent the visitor from accessing the intended web page. The servers 110 may determine if the traffic is indicative of malicious activity based on whether or not there were successful challenges, the traffic patterns of the visitor, the quantity of web requests performed within a certain period of time, and/or a variety of other factors. If the service provider 111 decides to deny access to the web page, the service provider 111 and/or the customer can add identifiers associated with the visitor to a black list. For example, the black lister 306 of FIG. 3, which can be a server 110, can add visitors to black lists. A black list can be a list which includes a list of internet protocol addresses or other identifiers utilized to block the visitor from accessing web pages of a customer.

Figure 10:
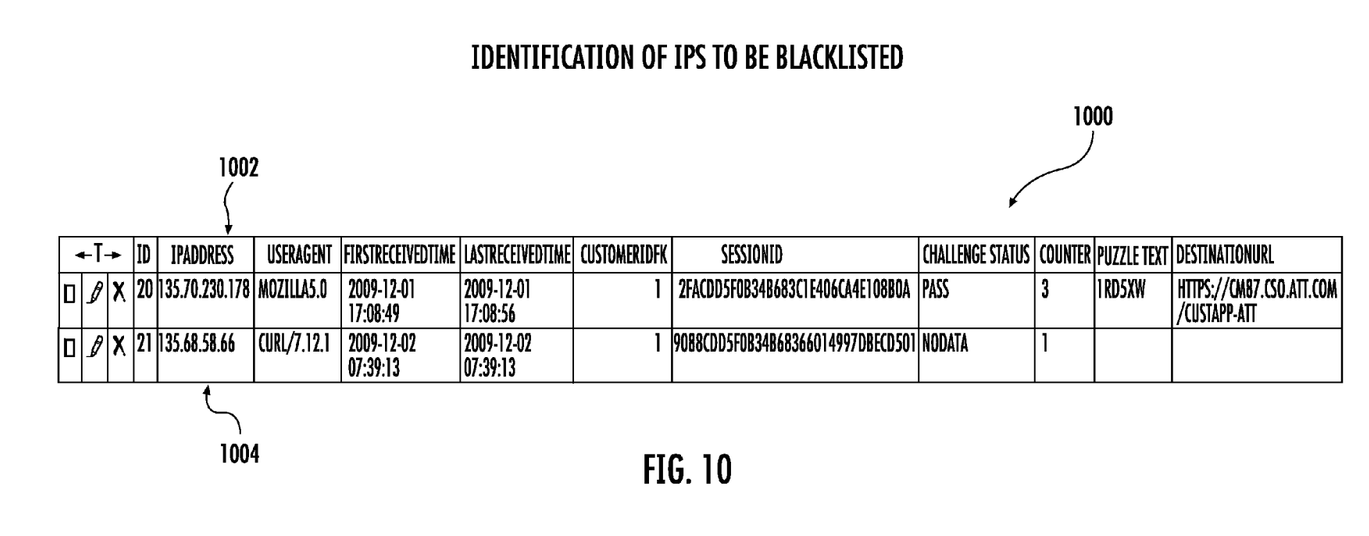
FIG. 10 is a screenshot featuring internet protocol addresses which have been identified to be blacklisted.

In FIG. 10, an interface 1000 illustratively displaying a visitor to be blacklisted is illustratively shown. The interface 1000 includes an internet protocol address of a first visitor 1002, which in this case is 135.70.230.178, and an internet protocol address of a second visitor 1004, which is 135.68.58.66. As shown, the first visitor 1002 passed the challenge by correctly entering in the challenge text, "1rd5xw." However, the second visitor 1004 may be black listed. If the second visitor 1004 did not receive the challenge because the second visitor 1004 attempted to access the web page with a script rather than a web browser, then the service provider's servers 110 may black list the second visitor. If the second visitor 1004 utilized a script to access the web page rather than a web browser, a script request generated from the service provider's code segment embedded in the customer's web pages may not have been sent to the service provider 111. In an embodiment, identifiers associated with visitors may be added to a black list if they fail challenges greater than or equal to N times. Also, identifiers of visitors may be added to the black list if there is no data for the challenge status and the difference between the current time and the last received time is greater than a predetermined amount of time. This may indicate that the page was invoked from a script.

In one embodiment, the black list may be transmitted to and/or shared with the customer. In another embodiment, a white list may be created, which includes identifiers of visitors that have not been suspected of malicious activity. However, if visitors that are on the white list fail future challenges, are analyzed to have suspicious traffic patterns, and/or are deemed to otherwise be suspected of malicious activity, the visitors may be transferred to the black list. In yet another embodiment, a first time visitor that fails a challenge can be displayed the screenshot 700 as shown in FIG. 7 or another alternate web page. However, once the visitor is added to the black list, the visitor may be prevented from even seeing the alternate web page. In still another embodiment, servers 110, such as the black lister 306 from FIG. 3, can transmit black lists to guard/router access control lists. In another embodiment, the system 100 may be configured to handle SSL traffic as customer certificates do not have to be installed on the servers 110 of the service provider 111. In a further embodiment, peacetime learning may be utilized to automatically trigger attack detection and mitigation. In addition, the system 100 may be utilized to augment and/or verify customer provided information during an attack.

Figure 11:
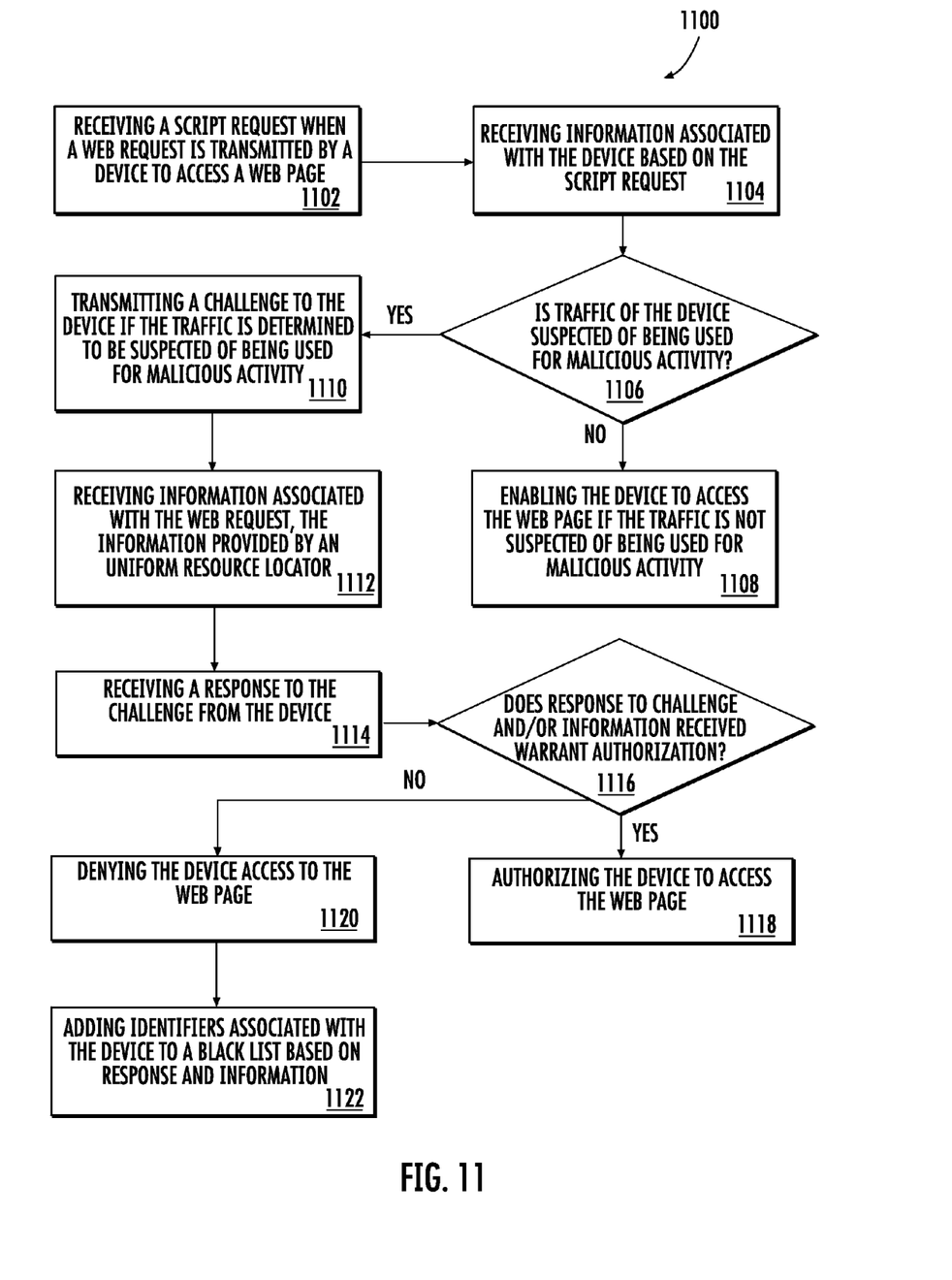
FIG. 11 depicts an exemplary method for defending against internet-based attacks according to an embodiment of the present invention.

Referring now also to FIG. 11, an exemplary method 1100 for defending against internet-based attacks is depicted. The method 1100 may include, at step 1102, receiving a script request when a web request is transmitted by a device 104 to access a web page 400. For example, as noted above, the service provider 111 can insert a code segment into the customer's web pages, which when accessed by a browser of a visitor causes the browser to make a script request (e.g. JavaScript call) to the service provider 111. At step 1104, the method may include receiving information associated with the device 104, which may be based on the script request. Such information can include, but is not limited to including, an internet protocol address of the visitor, the uniform resource locator associated with the web page the visitor was attempting to access, a user agent string from an HTTP header field, a time stamp, a customer identifier, a visitor identifier, and/or other information. The information may be stored in a database 112 at the service provider 111.

At step 1106, the method may include determining if traffic associated with the device 104 is suspected of being used for malicious activity. This determination can be performed by the service provider 111 and/or the service provider's customer. If the traffic of the device 104 is determined to not be suspected of being used for malicious activity, then the method may include enabling the device 104 to access the web page 400 at step 1108. However, if it is determined that the traffic from the device 104 is suspected of being used for malicious activity, the method may include transmitting a challenge to the device 104 at step 1110. At step 1112, the method may include receiving information associated with the web request, which can be provided to the service provider 111 by invoking a uniform resource locator and/or an application programming interface provided to the customer. The customer can utilize the uniform resource locator to pass the information to the service provider 111. Such information can include, but is not limited to including, a session identifier, an internet protocol address of the visitor, a user agent string, and a uniform resource locator associated with the web page. Additionally, information concerning all web requests that the visitor made can also be sent to the service provider 111.

At step 1114, the method may include receiving a response to the challenge from the device 104. The response to the challenge and/or the information received associated with the web requests and the device 104 may be analyzed to determine if the visitor should be authorized to access the web page 400 at step 1116. Additionally, a challenge status, information associated with the challenge (e.g. challenge puzzle text), a customer identifier, a counter associated with the challenge, and first and last received time stamps may be analyzed to determine if the visitor should be authorized. If the response accurately responds to the challenge and/or the information associated with the web requests and the device 104 warrants authorization, the method may include authorizing the visitor/device to access the web page at step 1118. If, however, the response to the challenge and/or information does not warrant authorization, the method may include, at step 1120, denying the visitor/device access to the web page. In an embodiment according to the method, the method may include transmitting a rejection notice web page 700 and/or an alternate web page to the device 104 if an incorrect response to the challenge is received, no response to the challenge is received, and the analyzed information indicates actual or potential malicious activity.

In another embodiment, the method may include transmitting additional challenges (up to a threshold amount) to the visitor if the visitor fails a challenge or fails to respond to the challenge. Different types of challenges can be transmitted such as, but not limited to, puzzles, quizzes, questionnaires, password request, captchas, and/or other types of challenges. At step 1122, the method may include adding an identifier associated with the device 104 to a black list based on at least one of the received information associated with the web request, the received information associated with the device, and challenge responses. In one embodiment, the method may include adding an identifier associated with the device 104 (e.g. internet protocol address) to a black list if an incorrect response to the challenge is received and/or no response is received. A black list, as noted above, can serve as a list of internet protocol addresses or other identifiers of visitors to block from accessing web pages of a customer. Similarly, if an analysis of the received information reveals malicious or potentially malicious activity, the device/visitor can be added to the black list as well. In an embodiment, the analysis the of the received information may include determining traffic patterns from various web requests initiated by the visitor. If the analysis of the traffic patterns reveals suspicious activity, the device/visitor can be added to the black list. Similarly, if the analysis reveals no suspicious activity, the device/visitor can be added to a white list.

In another embodiment, the method may include determining that the web request by the device 104 was not generated by a web browser of the device 104 if a script request is not received by the service provider. In such a case, it can be determined that the visitor is utilizing a script to access the web page 400 rather than a web browser. If the visitor is utilizing a script, identifiers associated with the device/visitor can also be added to a black list. It is important to note that the methods described above may incorporate any of the functionality, devices, and features of the systems described above and are not intended to be limited to the description provided above.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard), a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; non-transitory mediums, non-transitory computer-readable mediums, computer-readable devices, or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

What is claimed is:

1. A method for defending against internet-based attacks, the method comprising:
   receiving a script request when a web request is transmitted by a device to a customer server to access a web page, wherein the script request is generated based on a code segment of the web page;
   determining that the web request was generated by a script if the script request is not received and if there is no data for a challenge status associated with the device;
   receiving information associated with the device based on the script request generated based on the code segment;
   determining, utilizing instructions stored in memory and executed by a processor, whether traffic associated with the web request from the device to the customer server is suspected of being used for malicious activity;
   enabling the device to access the web page if the traffic is determined not to be suspected of being used for malicious activity;
   transmitting a challenge to the device if the traffic is determined to be suspected of being used for malicious activity;
   receiving information associated with the web request, wherein the information associated with the web request is provided by a uniform resource locator invoked in response to the traffic being determined to be suspected of being used for malicious activity; and
   authorizing the device to access the web page based on a correct response to the challenge being received from the device.

2. The method of claim 1, further comprising transmitting an alternate web page to the device based on data selected from the group consisting of an incorrect response being received from the device in response to the challenge, no response being received from the device in response to the challenge, the information associated with the device, and the information associated with the web request.

3. The method of claim 1, further comprising transmitting an additional challenge to the device if an incorrect response to the challenge is received from the device.

4. The method of claim 1, further comprising adding an internet protocol address associated with the device to a black list if one of an incorrect response to the challenge is received from the device and no response to the challenge is received from the device.

5. The method of claim 1, further comprising determining a traffic pattern associated with the traffic based on the information associated with the web request, adding an identifier associated with the device to a black list if the traffic pattern is determined to be abusive, and adding an identifier associated with the device to a white list if the traffic pattern is determined to not be abusive.

6. The method of claim 1, further comprising inserting the code segment into the web page, wherein the code segment is utilized to provide the information associated with the device attempting to access the web page.

7. The method of claim 1, further comprising authorizing the device to access the web page based on the information associated with the device, wherein the information associated with the device is selected from the group consisting of an internet protocol address, a uniform resource locator associated with the web page, and header field information.

8. The method of claim 1, further comprising authorizing the device to access the web page based on the information associated with the web request, wherein the information associated with the web request is selected from the group consisting of a session identifier, an internet protocol address, a user agent string associated with a header, and a uniform resource locator associated with the web page.

9. The method of claim 1, wherein the challenge is selected from the group consisting of a puzzle, a captcha, a questionnaire, and a password request.

10. A system for defending against internet-based attacks, the system comprising:
    a memory that stores instructions;
    a processor that executes the instructions to perform operations, the operations comprising:
       receiving a script request when a web request is transmitted by a device to a customer server to access a web page, wherein the script request is generated based on a code segment of the web page;
       determining that the web request was generated by a script if the script request is not received and if there is no data for a challenge status associated with the device;
       receiving information associated with the device when the web request is transmitted by the device to access the web page monitored by the electronic data processor;
       determining if traffic associated with the web request from the device is suspected of being used for malicious activity;
       enabling the device to access the web page if the traffic is determined not to be suspected of being used for malicious activity;

transmitting a challenge to the device if the traffic is determined to be suspected of being used for malicious activity;

receiving information associated with the web request, wherein the information associated with the web request is provided by a uniform resource locator invoked in response to the traffic being determined to be suspected of being used for malicious activity; and authorizing the device to access the web page based on a correct response to the challenge being received from the device.

11. The system of claim 10, wherein the operations further comprise denying the device access to the web page based on data selected from the group consisting of an incorrect response to the challenge being received from the device, a response to the challenge not being received from the device, negative results from analysis of the information associated with the device, and negative results from analysis of the information associated with the web request.

12. The system of claim 10, wherein operations further comprise adding an internet protocol address associated with the device to a black list if the script request is not received.

13. The system of claim 10, wherein the operations further comprise determining that the web request was not generated by a web browser of the device if the script request is not received.

14. The system of claim 10, wherein the information associated with the device is received based on the script request generated from a code segment of the web page.

15. The system of claim 10, wherein the operations further comprise transmitting an alternate web page to the device if a condition is met, wherein the condition is selected from the group consisting of an incorrect response to the challenge is received from the device and a response to the challenge is not received from the device.

16. The system of claim 10, wherein the operations further comprise determining a traffic pattern based on analysis of the information associated with the web request, and wherein the operations further comprise adding an identifier associated with the device to a black list if the traffic pattern is determined to be abusive.

17. A computer-readable device comprising instructions, which, when loaded and executed by a processor, cause the processor to perform operations comprising:

receiving a script request when a web request is transmitted by a device to a customer server to access a web page, wherein the script request is generated based on a code segment of the web page;

determining that the web request was generated by a script if the script request is not received and if there is no data for a challenge status associated with the device;

receiving information associated with a device when the web request is transmitted by the device to access the web page;

determining if traffic associated with the web request from the device is suspected of being used for malicious activity;

enabling the device to access the web page if the traffic is determined not to be suspected of being used for malicious activity;

transmitting a challenge to the device if the traffic is determined to be suspected of being used for malicious activity;

receiving information associated with the web request, wherein the information associated with the web request is provided by a uniform resource locator invoked in response to the traffic being determined to be suspected of being used for malicious activity; and authorizing the device to access the web page based on a correct response to the challenge being received from the device.

18. The computer-readable device of claim 17, wherein the operations further comprise denying the device access to the web page based on data selected from the group consisting of an incorrect response to the challenge being received from the device, a response to the challenge not being received from the device, negative results from analysis of the information associated with the device, and negative results from analysis of the information associated with the web request.

19. The computer-readable device claim 17, wherein the operations further comprise transmitting an additional challenge to the device if an incorrect response to the challenge is received from the device.

20. The computer-readable device of claim 17, wherein the operations further comprise determining that the web request was not generated by a web browser of the device if the script request is not received.

* * * * *